Patented Sept. 30, 1930

1,777,026

UNITED STATES PATENT OFFICE

JULIUS ALSBERG, OF NEW YORK, N. Y., ASSIGNOR TO B. HELLER & COMPANY, OF CHICAGO, ILLINOIS, A CORPORATION OF ILLINOIS

SMOKE FLAVOR AND AROMA IMPARTING BINDER FOR FOOD PRODUCTS, ETC.

No Drawing.   Application filed October 31, 1925.   Serial No. 65,944.

My invention relates to improvements in binding mediums, for use in connection with food products, and the same has for its object more particularly to provide a medium for use in connection with meats and the like whereby a distinctive smoky flavor or aroma may be readily and economically imparted thereto.

Further, said invention has for its object to provide a binding medium by means of which a flavor or aroma may be imparted to meats substantially the same as that occurring or produced in meats when the same are subjected to customary "smoking" operations.

Further, said invention has for its object to provide a binding medium containing the same, or substantially the same elements or constituents which produce or impart to the meat the "smoky" aroma and flavor occurring or produced in meats subjected to the customary "smoking" operations.

Further, said invention has for its object to provide a binding medium in which are combined the same or substantially the same flavor and aroma bearing elements as those which are obtained from the smoke or smoke producing substances used in the smoking of meats in the customary manner.

Further, said invention has for its object to provide a binding medium adapted to impart to meats and the like a smoke flavor or aroma, and at the same time serve as a preserving medium or agent for the meat or product.

Further, said invention has for its object to provide a wholesome composition of the character described, which will be free from objectionable or injurious elements or ingredients.

Further, said invention has for its object to provide a simple and inexpensive method of producing said composition.

Other objects will in part be obvious and in part be hereinafter described.

To the attainment of the aforesaid objects and ends my invention consists in the novel combination of elements or ingredients hereinafter specified, and in the method comprising the successive steps hereinafter more fully described and then pointed out in the claims.

In producing a composition for imparting a smoke flavor and aroma to articles of food and the like I first take a quantity of suitable vegetable matter such as maple, hickory, beech or birch wood, corn cobs, etc., according to the preference of the particular user. I have found maple wood is very satisfactory as it yields a more desirable flavor and is better suited for use in connection with meat and other food products.

The wood is next preferably reduced to small pieces and placed in a suitable closed retort and subjected to heat for a sufficient length of time to effect the destructive distillation of the wood. In order to obtain the best results the destructive disillation should preferably be effected at a slow rate of combustion, and in the presence of a limited supply of air which may be introduced into the retort in any suitable or convenient manner.

The volatile products coming over are received in a condenser where the same are brought into a liquid state, and thereupon the same are conducted to a suitable receiver. The resulting condensate consisting essentially of the smoke flavor and aroma bearing constituents, and water, methyl alcohol and other deleterious constituents is then separated from the fixed gases such as carbon monoxide and carbon dioxide and other gases which may be present in smaller quantities or traces. The said gases may be discharged into the atmosphere or conducted by suitable means to a furnace to be used as fuel.

Before the gases are discarded or conducted away for use as fuel, the same should be washed by passing the said gases through a quantity of the end material or condensate obtained from a previous run in order to extract a certain amount of the smoke flavor and aroma bearing constituents which pass through the condenser.

The condensate or condensates above specified, including the condensate through which said gases have been passed, are then preferably conducted to a suitable storage tank or container in which the mass may be suitably agitated to produce a uniform mixture.

The mixture is then subjected to evaporation in order to reduce the water content thereof, and to eliminate certain deleterious constituents present in the water. This may be effected by placing the same in shallow pans, or by carrying the same as a film on the surface of a rotating drum or cylinder and subjecting the same to an air blast, or by any other suitable method. It is not necessary to remove all of the water present, but only so much thereof until the deleterious constituents present have passed off. In practice a reduction of the mass by about fifty per cent (50%) of its weight has been ascertained to be sufficient to remove substantially all of the deleterious substances. In order to minimize loss of flavor or constituents, the air, before being brought into contact with the liquid, and also the liquid acted upon by the air may be cooled.

The resulting product consisting of the smoke flavor and aroma bearing constituents plus the water normally present will be in the form of a more or less viscous emulsion or liquid, depending upon the degree of concentration, and possess a strong smoke odor and taste.

Preferably said smoke composition is combined with the binder employed in the making of sausage and the like, which binder usually consists of flour of the grade adapted for the purpose. I have discovered that the smoke composition may be incorporated with the binder in an amount sufficient for the intended purpose without the resulting mixture becoming moist to such degree as will render the same sticky, or to prevent its being handled in the manner of ordinary binder or flour. The smoke composition is uniformly distributed throughout the mass of the binder or flour, adhering to the particles thereof as thin films or layers. The relative proportions of the smoke composition and of the binder may be varied in accordance with the nature of the meat or other article or product with which the same is to be incorporated and in accordance with the desire of the individual user. In practice it has been found that the addition of about ten per cent (10%) by weight, more or less, of the above described mixture consisting of the smoke flavor and aroma bearing constituents and water after about fifty per cent (50%) of the latter has been removed, to each pound of binder is sufficient to impart the desired taste, aroma and color to the article with which said composition is to be incorporated, the amount of smoke flavor and aroma bearing constituents added depending on the concentration thereof. As the smoke flavor and aroma bearing constituents possess an odor and flavor of great strength only a very small quantity thereof need be combined with the binder medium or flour to impart the desired qualities to the article of food to be treated.

It is to be noted that where an article of food such as meat is subjected to the customary smoking operations in order to impart thereto the well known smoky flavor and aroma, and at the same time to preserve the meat, a comparatively long time is required to accomplish the desired result, the article losing thereby considerable weight by reason of the evaporation of the water therein, and that even after long exposure to the action of the smoke the fumes do not, as a rule, penetrate very deep below the surface of the meat. However, by the use of my composition the desired smoky flavor, aroma and color may be economically and quickly imparted to the meat without causing shrinkage of the meat due to loss of water, and that the smoke flavor, aroma and color will be uniformly distributed throughout the entire mass. Further the said composition will also serve to preserve the meat against deterioration.

It will, of course, be understood that while this invention is described in connection with food products and the like that the same is not necessarily limited thereto, as the same may readily be employed in connection with any other article or product to which a smoke flavor or aroma is to be imparted.

Having thus described my said invention what I claim and desire to secure by Letters Patent is:

A composition of the character described, comprising flour serving as a binder for food and other products, combined with a condensate obtained from the destructive distillation of wood, and including the smoke flavor and aroma bearing constituents remaining after the removal of water and the deleterious constituents of said condensate, substantially as specified.

Signed at the city of New York, in the county and State of New York, this 27th day of October, one thousand nine hundred and twenty-five.

JULIUS ALSBERG.